March 22, 1932.　　　C. H. MORLEY　　　1,850,763
MITE TRAP
Filed Oct. 21, 1930
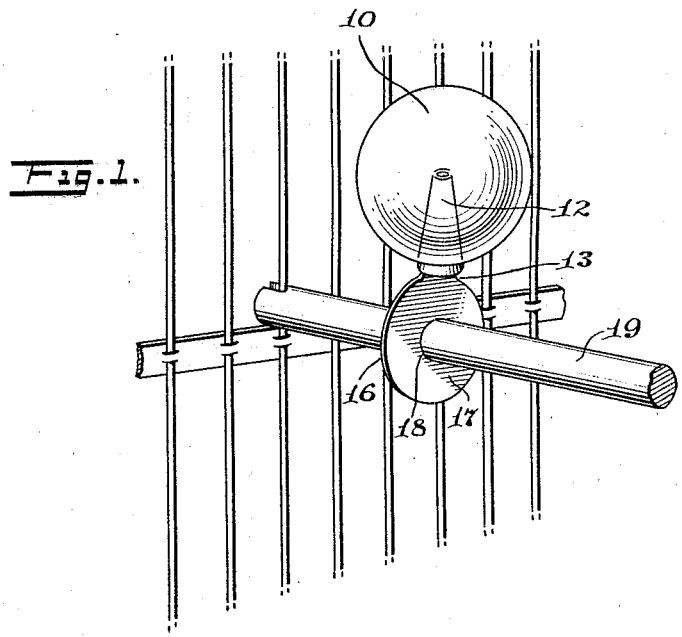
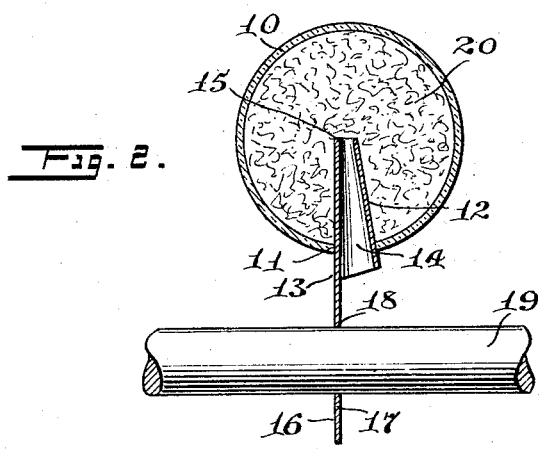
WITNESSES
INVENTOR
Clarence H. Morley
BY
ATTORNEYS Patented Mar. 22, 1932

1,850,763

UNITED STATES PATENT OFFICE

CLARENCE H. MORLEY, OF PATCHOGUE, NEW YORK

MITE TRAP

Application filed October 21, 1930. Serial No. 490,308.

The invention has for an object to provide a mite trap which is of particular value in trapping mites in bird cages.

The invention also has an object which is to provide a mite trap which may be mounted on a perch in a bird cage to trap the mites when they leave the bird.

Another object of the invention is to provide the mite trap with a disc or fender which may be mounted on a perch and from which extends upwardly a conical passageway leading to a receptacle for receiving and retaining the mites.

Additional objects of the invention will appear in the following specification in which the preferred form of the invention is described.

In the drawings similar reference characters refer to similar parts in all the views, of which Figure 1 is a perspective fragmentary view showing a part of a bird cage with an end of a perch on which the mite trap is mounted, and Figure 2 is a perspective sectional view of the mite trap shown in Figure 1 and illustrating a fragment of a perch on which the mite trap is mounted.

While the invention is illustrated in connection with its use as mounted on a perch in a bird cage, it will be understood that the mite trap may be used in various ways and under various conditions, as occasion may require.

The mite trap is provided with a receptacle 10 which may be in the form of a glass ball with an opening 11 in its bottom, through which is disposed the conical end 12 of a member 13, this conical end 12 of the member 13 having a passageway 14, the sides of which converge upwardly, so that the terminal 15 of the passageway will be disposed at a distance from the opening 13 in the receptacle 10. The other end 16 of the member 13 is in the form of a disc plate 17 having an aperture 18 through which a perch 19 may be disposed. Preferably the receptacle 10 is filled with a soft, woolly, fabric material 20, such as cotton.

It is known that the mites leave birds at times, and particularly at night and that when the mites leave the birds they endeavor to reach a member in order to crawl upwardly. When the mites leave the birds they will crawl along the perch 19 until they reach the disc 17, when they will crawl up the disc and up through the conical passageway 14 into the interior of the receptacle 10 and into the soft, woolly, fabric material 20, such as cotton. In this way the mites may be trapped and may be exterminated.

What is claimed is:

1. A mite trap having a receptacle and a member supporting the receptacle, the member forming a passageway leading to the receptacle, the sides of which converge in the direction of the receptacle.

2. A mite trap having a receptacle with an opening, and a member extending in the opening for supporting the receptacle and having a passageway leading into the central part of the receptacle, the sides of the passageway converging in the direction of the said central portion of the opening.

3. A mite trap having a receptacle and a supporting member for the receptacle, the supporting member having a passageway leading to the receptacle, the sides of which converge in the direction of the receptacle, and a woolly material disposed in the receptacle.

4. A mite trap having a receptacle with an opening in its bottom, and a member with means by which it may be mounted on a perch disposed below the receptacle having a passageway leading up into the receptacle through its opening the member serving as the sole support for the receptacle.

5. A mite trap having a receptacle with an opening in its bottom, a member with means by which it may be mounted on a perch disposed below the receptacle having a passageway leading up into the receptacle through its bottom, the member serving as the sole support for the receptacle and a woolly material disposed in the receptacle.

6. A mite trap having a passageway with an opening in its bottom, and a member with means by which it may be mounted on a perch disposed at the bottom of the receptacle with a passageway converging upwardly into the interior of the receptacle, the member serving as the sole support for the receptacle.

7. A mite trap having a receptacle with an opening, a plate with an opening through which a perch may be disposed, and means forming a passageway leading from the plate through the opening into the receptacle.

8. A mite trap having a receptacle with an opening, a plate with means by which it may be mounted on a perch, and means forming a converging passageway leading from the plate to the receptacle.

9. A mite trap having a receptacle with an opening, a member having at one end a disc with an opening and at the other end a passageway, the member at its last mentioned end being secured to the receptacle at the opening therein.

10. A mite trap having a receptacle with an opening, a member having at one end a disc with an opening and at the other end a passageway converging in the direction of the receptacle, the member at its last mentioned end being secured to the receptacle at the opening therein.

11. A mite trap having a receptacle with an opening, a member having at one end a disc with an opening and at the other end a passageway converging in the direction of the receptacle, the member at its last mentioned end being secured to the receptacle at the opening therein, and a woolly material disposed in the receptacle.

12. A mite trap having a supporting member with a passageway leading upwardly, a receptacle with an opening in its bottom in which the supporting member is disposed, the engagement of the supporting member with the receptacle serving as the sole support for the receptacle.

13. A mite trap having a supporting member with a passageway leading upwardly, a receptacle with an opening in its bottom in which the supporting member is disposed, the engagement of the supporting member with the receptacle serving as the sole support for the receptacle, with a woolly material disposed in the receptacle around the member.

CLARENCE H. MORLEY.